June 21, 1960   R. G. RUSSELL ET AL   2,941,744
COLLAPSIBLE MANDRELS

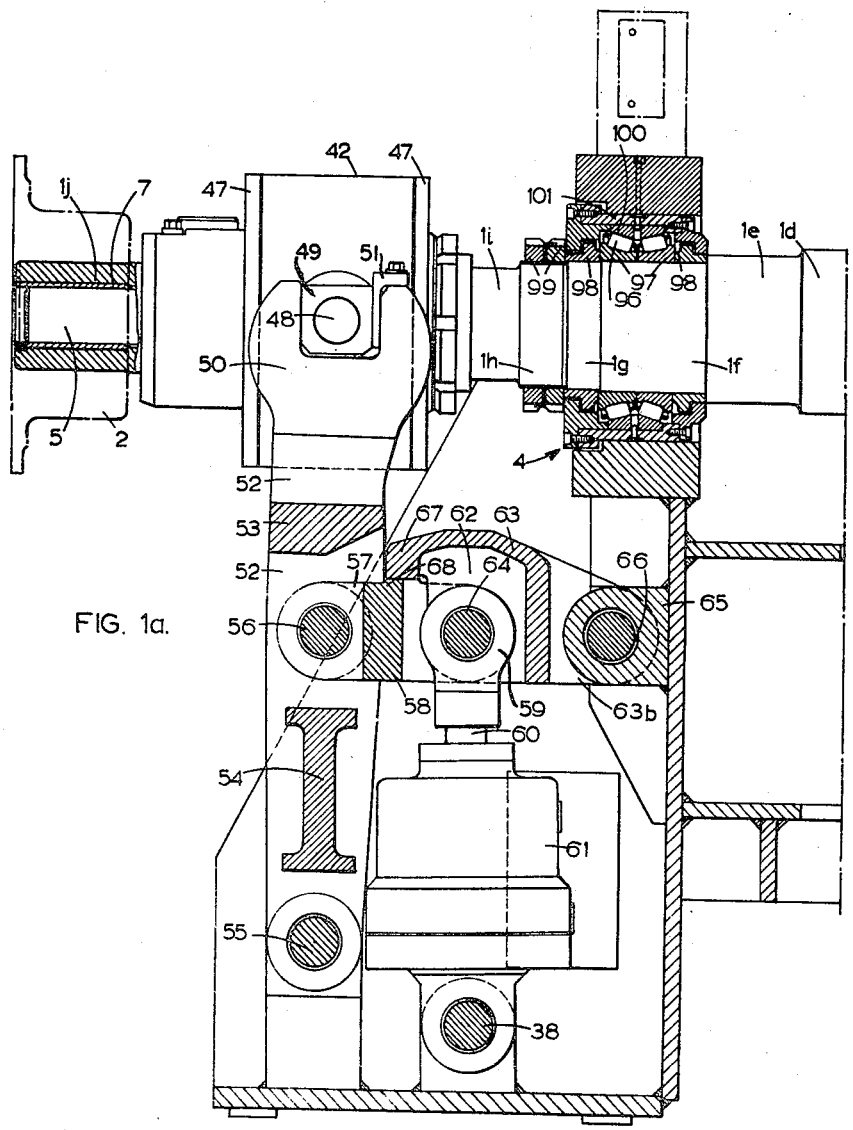

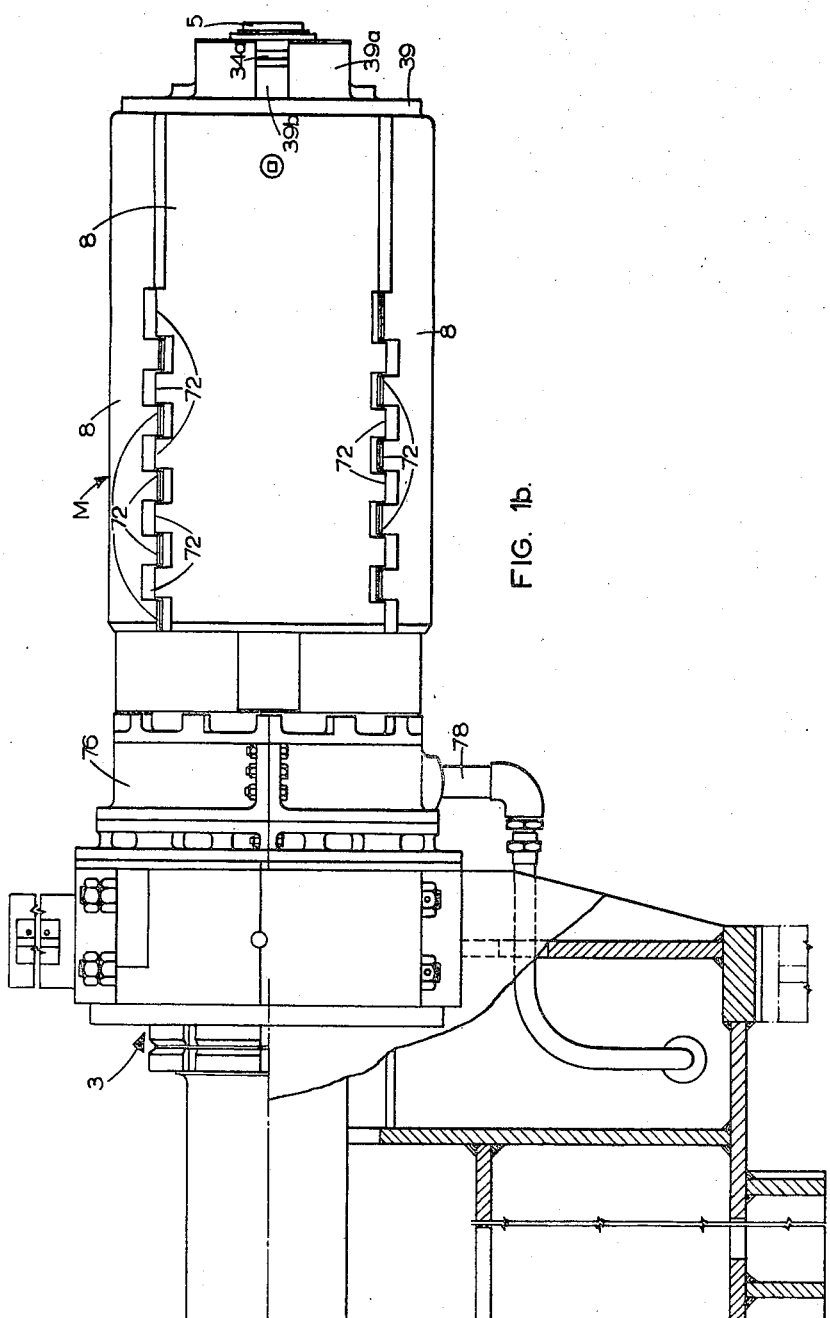

Filed Jan. 25, 1956   8 Sheets-Sheet 6

ROBERT GORDON RUSSELL,
DENNIS GEORGE BLOOMFIELD,
INVENTORS

BY
ATTORNEYS

June 21, 1960  R. G. RUSSELL ET AL  2,941,744
COLLAPSIBLE MANDRELS
Filed Jan. 25, 1956  8 Sheets-Sheet 8
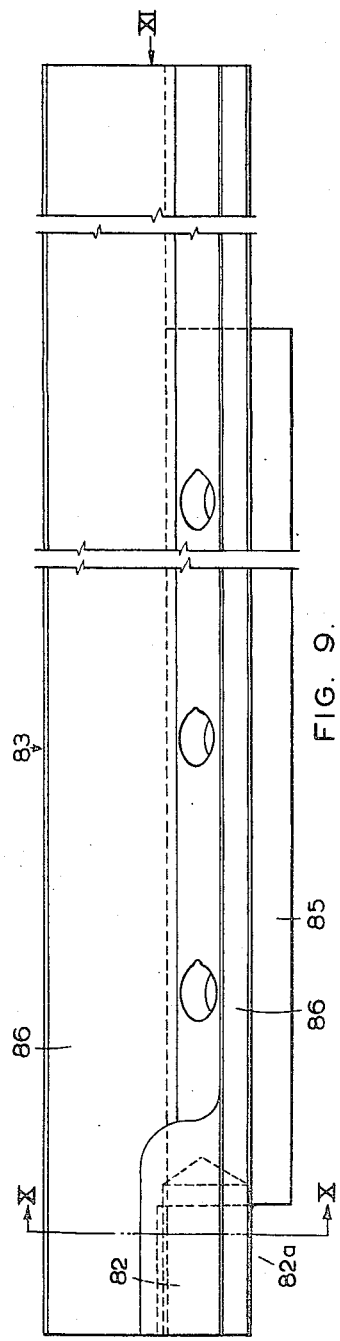
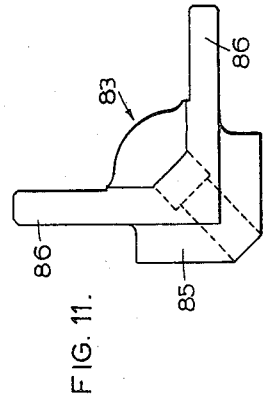
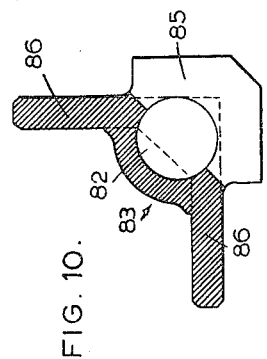
ROBERT GORDON RUSSELL,
DENNIS GEORGE BLOOMFIELD,
INVENTORS
BY
ATTORNEYS United States Patent Office 2,941,744
Patented June 21, 1960

2,941,744
COLLAPSIBLE MANDRELS
Robert Gordon Russell, Sheffield, and Dennis George Bloomfield, Rotherham, England, assignors to Davy and United Engineering Company Limited, Sheffield, England Filed Jan. 25, 1956, Ser. No. 561,318

Claims priority, application Great Britain Jan. 25, 1955

12 Claims. (Cl. 242—72.1)

This invention relates to collapsible mandrels or drums for use in coiling strip material, particularly strip metal received from rolling mills; and an object of the invention is to provide a robust and efficient mandrel that is very suitable for use with hot strip steel received from a hot mill.

According to the present invention, a collapsible mandrel or drum includes a rotatable shaft, a number of segments distributed round the shaft and presenting a mandrel surface, on which strip material can be coiled, means for transmitting torque from the shaft to the segments, means for adjusting the radial distance from the shaft axis of the segments, which are locked in an extreme position corresponding to the expanded condition of the mandrel, and resilient means mounted to act between the segments and an abutment which is fixed against translational movement, at least when said means for adjusting the segments are locked, so as to enable the segments to yield in the event of an abnormally large hoop stress in material coiled on the mandrel or drum being encountered. The said means for adjusting the radial distance of the segments, i.e. for causing the expansion and contraction of the mandrel, may comprise wedge faces on the shaft mating with wedge faces on the segments, so that, as the latter undergo their axial movement, they ride inwards or outwards on the wedge faces of the shaft.

The mandrel shaft is preferably tubular and the axial movement imparted to the segments by an actuating or control rod extending through the shaft and coupled to the segments beyond one end of the shaft. In this case the mandrel is, of course, supported by bearings carrying the shaft beyond the opposite ends of the segments.

Advantageously the torque is transmitted between the shaft and segments by interengaging parts formed respectively on the shaft and segments, these parts being provided with lips and recesses inclined similarly to the wedge faces, to move over one another and ensure that the mandrel contracts when the segments are moved longitudinally in the appropriate direction.

The aforesaid actuating rod may be moved towards and away from the position in which the mandrel is expanded by means of a toggle linkage that is locked in the dead centre position when the mandrel is expanded. Then the resilient means may be interposed between one end of the toggle linkage and an abutment, so that the centre linkage in its dead-centre condition, can yield longitudinally against the action of the resilient means in the event of abnormal radial pressure on the mandrel arising. Preferably, however, the resilient means are interposed between the actuating rod and the segments.

A very important feature of the invention, believed to be new in itself, consists in a collapsible mandrel or drum including a rotatable shaft, a number of segments distributed round the shaft and presenting a mandrel surface, means for transmitting torque from the shaft to the segments, means for adjusting the radial distance from the shaft axis of the segments, sealing means interposed between adjacent edges of the segments to provide in all conditions in the range of expansion or contraction of the mandrel a sealed conduit within and extending along the mandrel, and means for causing liquid to flow into the conduit to cool the mandrel and lubricate the means for adjusting the segments radially.

In order that the invention may be clearly understood and readily carried into effect, apparatus in accordance therewith will now be described, by way of example, with reference to the accompanying drawings in which:

Figures 1a, 1b constitute a side elevation, shown partly in section, of a mandrel or coiler drum assembly, Figures 2a, 2b constitute a vertical section through part of the assembly shown in Figures 1a, 1b, Figures 3a, 3b constitute a vertical section similar to that of Figures 2a, 2b but showing the parts in a different operative condition.

Figure 6 is a section on the line VI—VI in Figure 2a,

Figure 9 is a side elevation of a detail;

Figure 10 is a section on the line X—X in Figure 9,

Figure 11 is an end elevation of the detail of Figure 9 as viewed in the direction of the arrow XI;

Figure 2A:
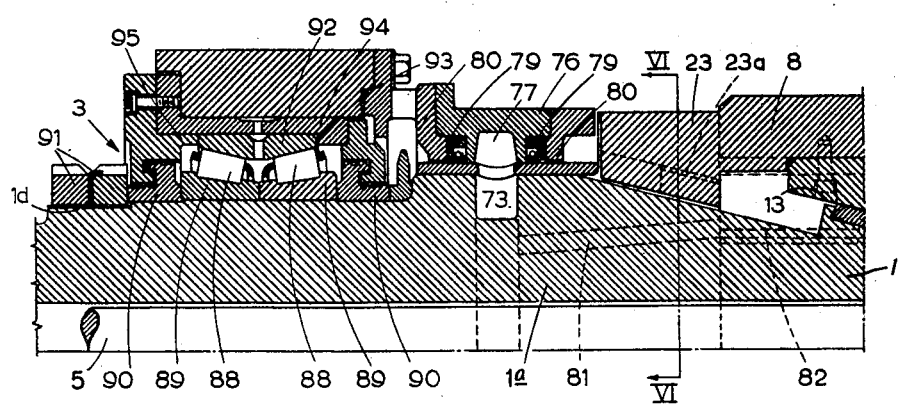
Figure 3A:
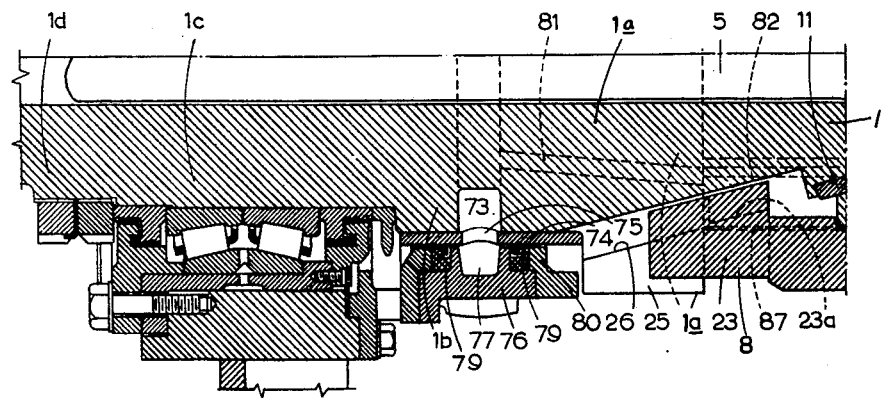

Referring particularly to Figures 1a, 1b, 2a, 2b, 3a, 3b, the assembly comprises a central shaft having portions 1, 1a at its right hand end lying within the mandrel or drum M proper. To the left of the mandrel M the shaft comprises a series of portions 1b . . . 1j of varying diameters. The left-hand end 1j of the shaft is connected to be driven by a collar 2, shown in chain lines in Figure 1a, by an electric motor with intervening reduction gear (not shown). The shaft is supported by an anti-friction thrust bearing 3 (described in greater detail below) embracing the portion 1c and by an anti-friction bearing 4 (also described in greater detail below) embracing the portion 1f.

The shaft 1 . . . 1j is tubular and an actuating rod 5 for the mandrel extends therethrough, being supported in bushes 6, 7 in opposite ends of the shaft with sealing ring 6a held by collar 6b but having some clearance with respect to the shaft along the major portion of its length. The actuating rod or member rotates with the shaft and is arranged to reciprocate relatively thereto. Within the mandrel proper the portion 1 of the shaft is of square cross-section (Figures 4 and 5) and about this square portion of the shaft are arranged four mandrel segments 8 registering respectively with the four faces of the portion 1 of the shaft. The arcuate faces 9 of these segments 8 are such that, when the mandrel is expanded to its full extent, they lie on a true cylinder. Intermediate the ends of the square part of the shaft, each face thereof is formed with a series of three wedge faces 10 (Figure 2b), each making an angle of 15 degrees of arc with the horizontal. Each such wedge face 10 is formed with a recess in which is located a replaceable block 11 of bearing metal having its exposed face parallel to that of the wedge face. Mating with each set of three such bearing blocks 11 is a wedge member 12 fixed by screws 12a in a recess 12b in the inner face of the mandrel segment 8 that registers with the face of the square portion 1 of the shaft on which the blocks are mounted. Each such wedge member 12 is, therefore, formed on its inner face with a series of three wedge faces 13, each lying at an angle of 15 degrees of arc to the horizontal.

Figure 6:
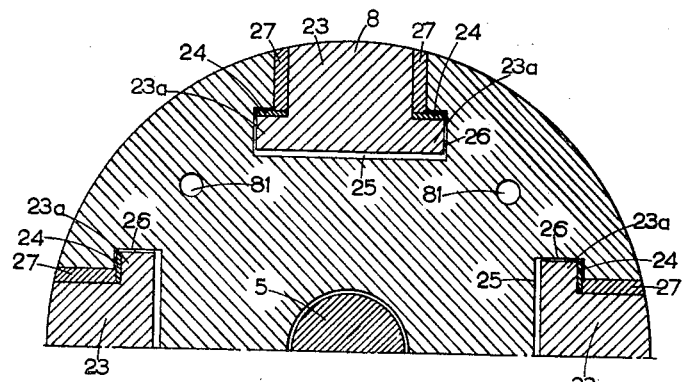
Figure 7:
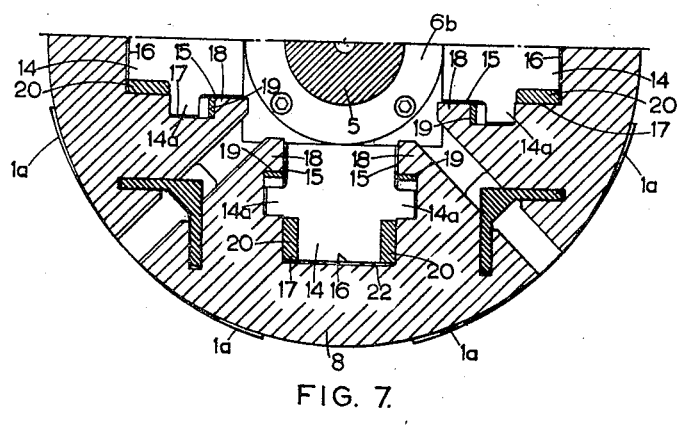
Figure 7 is a section on the line VII—VII in Figure 3.

Beyond the wedge faces at the forward end of the mandrel, that is to say the free end of the mandrel remote from the bearings 3, the square portion 1 of the shaft is formed respectively on its four flat faces with four radial projections 14, in cruciform pattern as viewed from one end, Figure 7. The wings 14a of each such projection overlie recesses 15 on the sides of the projection that are longitudinally disposed with respect to the mandrel. Each such recess 15 is inclined at the same angle as the aforesaid wedge faces and in the same sense, that is to say inwardly towards the mandrel axis as they extend towards the forward end of the mandrel. The outer faces 16 of the projections 14 are similarly inclined. Each segment 8 is formed with a cavity 17 into which the associated projection 14 extends. The cavity 17 is provided with lateral lips 18 that extend into and are inclined similarly to the recesses 15. Bearing metal 19 is mounted on the lips 18 to engage the inner faces of the wings 14a. Bearing metal 20 is also mounted on the sides of each cavity 17 to bear on the sides of the associated projection 14, outwardly of the wings 14a. The outer face 22 of each cavity is inclined similarly to the outer face 16 of the associated projection 14, but there is a little clearance between these two faces. The cavity 17 is longer than the projection 14 in the direction of the mandrel axis so as to enable the segment to move longitudinally with respect to the shaft, while the lips 18 travel up or down the undercut recesses 15. At the rear end of the mandrel M proper, that is to say at the opposite ends of the wedge member 12, four further sliding connections are provided between the shaft 1 and the segments 8. Thus, each segment 8 is formed at its left-hand end, as viewed in Figure 2a and 3a, with an extension 23 formed along its inner edges with wings 23a having bearing metal liners 24 applied to their radially outermost faces. Each extension 23 slides in a slot 25 in the portion 1a (Figures 2a, 3a and 6) of the shaft, this portion being a circular portion of less diameter than the expanded mandrel but of greater diameter than that of the contracted mandrel segments. Each slot 25 is formed with undercut lateral recesses 26 in which the wings 23a of the associated extension 23 slide. Bearing liners 27 are interposed between the sides of each slot 25 and the extension 23 contained therein, radially outside the wings 23a. The wings 23a, the lateral recesses 26 and the base of the slot 25 are inclined parallel to the inclined faces 13 on the associated wedge member 12.

The necessary torque is transmitted from the shaft to the segments 8, when the shaft rotates, by the sides of the projections 14, acting on the sides of the cavities 17, and by the sides of the slots 25, acting on the sides of the extensions 23. Outward movements under gravity or centrifugal force of the segments 8, when not bound by a coil, is prevented by the outer surfaces of the undercut recesses 26 acting on the wings 23a and by the lips 18 acting on the wings 14a.

Figure 12:
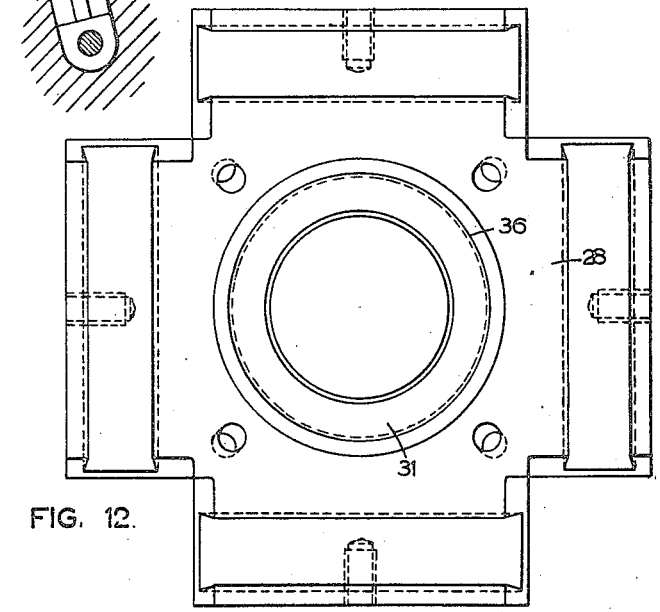
Figure 12 is an end elevation of a further detail.

At its extreme forward end, beyond the portion 1 of the mandrel shaft, the control rod 5 carries a cruciform plate 28 (Figures 2b and 12), at right angles to the mandrel axis, faced on both faces with bearing blocks 29. Figure 12 shows the plate 28 with the blocks 29 removed therefrom. These blocks 29 are mounted to slide in slots 30 formed on the inner faces of the segments 8 near the forward ends thereof. The means (described below) of attaching the plate 28 to the rod 5 are such that axial movement of the control rod is communicated to the segments 8. Thus, as the right-hand end of the rod 5 is pulled towards the left-hand end of the shaft 1 . . . 1j, the wedge members 8 rise up the wedge blocks 11 causing the mandrel to expand from the condition indicated by chain lines X in Figure 2b to the full line position of Figure 2b the expansion being limited by the nature of the rod actuating mechanism as described below.

When the movement of the rod 5 is reversed, contraction of the mandrel is ensured by the wings 23a riding down the undercut recesses 26 and by the lips 18 riding down the recess 15. The contraction of the mandrel is limited by the nature of the rod actuating mechanism described below.

The rod 5 is a sliding fit in a flanged bush 31 at the centre of the cruciform plate or connecting member 28 but normally the plate 28 behaves as if it was an integral part of the rod 5, being held in contact with a flange or abutment 32, formed on the rod 5, under the action of a compression spring 33 which reacts against a plate or abutment 34, formed with a central aperture within which the rod 5 fits, the plate or abutment 34 being held on the rod 5 by a circlip 35 sprung into a groove in the rod 5. The spring 33 is enclosed by telescoping tubes 36, 37 respectively forming parts of the plates 28, 34. The flanged bush 31 provides the abutment for the left-hand end of the spring 33. A sealing member 39 is mounted to slide on the outer tube 37 and is formed with an annular face 40 that bears on vertical faces at the ends of the segments 8. The face 40 is maintained in contact with the segments by three compression springs 41, only one of which appears in Figure 2b, equidistantly spaced about the axis of the mandrel. The sealing member 39 is formed with a collar 39a that surrounds the tube 37 with a little clearance. Three arms 34a project radially outwards from the plate 34, through slots in the upper edge of the collar 39a, over portions 39b of the sealing member 39. These portions 39b are formed with cavities, between the inner ends of which and the arms 34a the springs 41 act.

Figure 8:
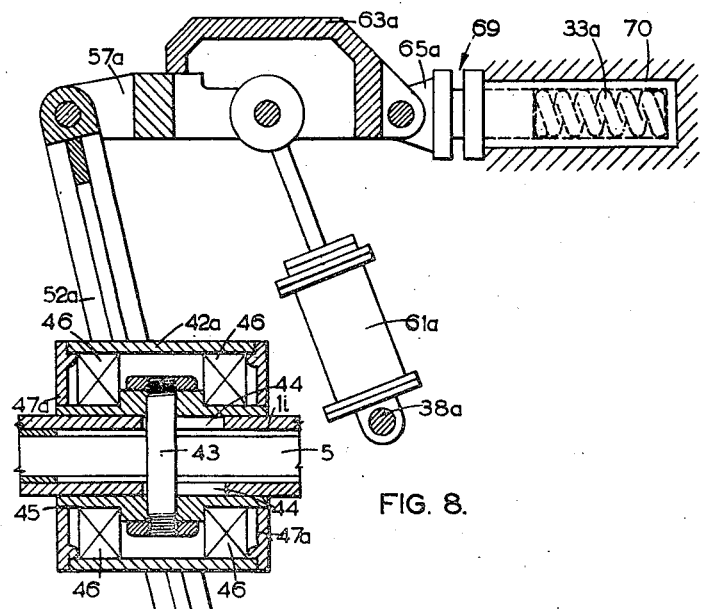
Figure 8 is a diagram showing a modification of the assembly of Figures 1 to 7.

If the hoop stress applied to the mandrel M becomes excessive, the segments 8 can yield radially inwards against the action of the compression spring 33, so as to eliminate undue stress in the mandrel and, incidentally, in the material being coiled. When this occurs the wedge faces 13 slide down the bearing blocks 11 and the left-hand faces of the slots 30 in the segments 8 force the plate 28 to the right and so compress the spring 33 against the plate 34. In this action the plate 28 separates from the flange 32 on the rod 5, it being understood that, when the mandrel M is in the expanded condition, the rod 5 is locked against movement to the right by means now to be described. For this propose it is necessary to turn to the rear end of the mandrel shaft 1 . . . 1j, behind the anti-friction bearing 4 (Figure 1a). However, the means whereby the rotating rod 5 is acted on so as to cause the mandrel to expand and contract comprise a non-rotatable cylinder 42 mounted for reciprocation along the axis of the shaft and the parts within this cylinder are the same as the parts within a cylinder 42a in Figure 8, which shows a modification of mechanism appearing in Figure 1a. Thus, the rod 5 carries a transverse cotter 43 which projects through lateral slots 44 formed longitudinally in the part 1i of the mandrel shaft, the slots 44 being long enough to enable the rod 5 to undergo the full extent of its required reciprocatory movement. Beyond these slots the opposite ends of the cotter 43, fit into apertures in a sleeve 45, free to slide longitudinally on the part 1i of the mandrel shaft, but constrained by the cotter 43 to rotate therewith. The sleeve rotates in anti-friction bearings 46 in the cylinder 42a, the bearings 46 being held in position laterally by end plates 47a (Figure 8) or 47 (Figure 1a). Referring now exclusively to Figure 1a, it will be observed that the cylinder 42 is furnished with diametrically opposed co-axial trunnions 48 (only one of which, however, appears in Figure 1a). Each trunnion is rotatably mounted in a bearing block 49 slidably mounted between the prongs of a fork 50. The block 49 bears on one side directly against one prong of the fork and against a replaceable bearing member 51 on the other side. The forks 50 are formed respectively at the upper ends of arms 52 fixed together by cross-pieces 53, 54 and pivoted about the horizontal axis of a journal 55. Between the arms 52 is pivoted, about the axis of a journal 56, a double link comprising two parallel parts fixed together by a cross-piece 58. The two parallel parts of the double link 57, forming one part of a toggle linkage, lie on opposite sides of a fork 59, at the top of a piston rod 60 in a double acting piston and cylinder assembly 61, mounted to rock about the axis of a journal 38. Between the two parts of the fork 59 a web 62, forming part of a link 63, is located, the fork 59, web 62 and link 57 being pivotally connected by a gudgeon 64. The link 63 constitutes the second part of the toggle linkage. The right hand end of the link 63 is furnished with parallel ears 63b lying on either side of a fixed lug 65 to which they are pivoted by means of a journal 66. The link 63 is formed with an abutment 67, that bears against an abutment 68 on the cross-piece 58, when the mandrel M is expanded to the maximum extent. The axes of the journal 56, the gudgeon 64 and the journal 66 are then in one horizontal flat plane and pressure is preferably maintained above the piston in the piston and cylinder assembly 61, the engagement of the abutments 67, 68 limiting the downward movement of the piston. The alignment of the three said axes means that the rod 5 cannot be moved to the right under the action of excessive hoop stress applied to the mandrel M and necessitates the provision of the compression spring 33 as described above. This spring may, however, be located elsewhere in the assembly; for example, as shown in Figure 8. In this it will be seen that the arms 52a, equivalent to the arms 52 in Figure 1a, are extended upwards beyond the cylinder 42a to a mechanism comprising links 57a, 63a and a piston and cylinder assembly 61a, similar to the elements 57, 63 and 61 in Figure 1a. However, in Figure 8, the lug 65a, to which the link 63a is pivoted, is not fixed but can yield against the action of a compression spring 33a contained in a telescopic cylinder 69 (the outer portion 70 of which is fixed in space). In this arrangement excessive hoop stress on the mandrel M does cause the rod 5 to move to the right, swinging the arms 52a clockwise and compressing the spring 33a through the medium of the linkage 57a, 63a. The cylinder in the piston and cylinder assembly 61a is pivoted about a fixed axis 38a so that the movement may be accompanied by a slight movement of the piston in the cylinder. In this modification the plate 28 is fixed to the rod 5.

Figure 2B:
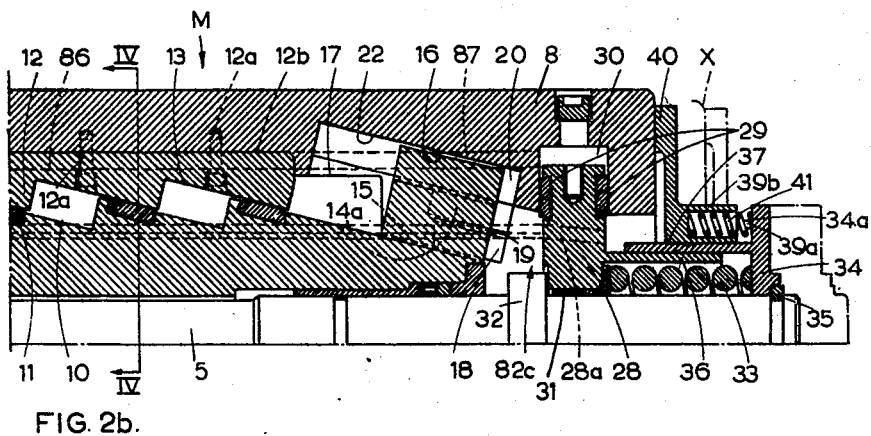
Figure 3B:
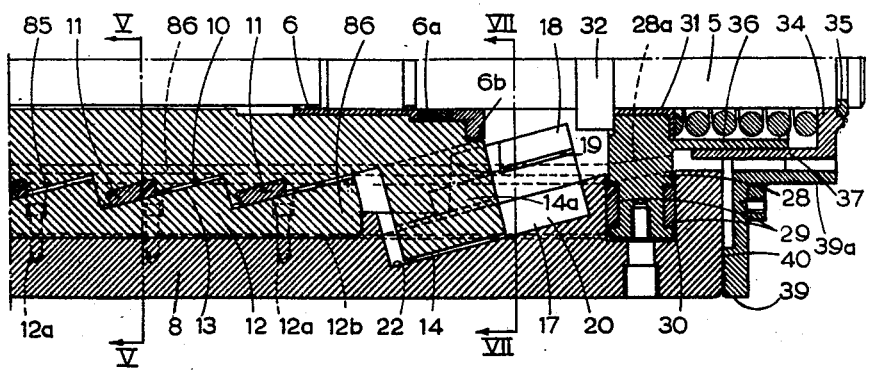

When it is desired to cause the mandrel M to contract to the condition indicated by the chain lines X in Figure 2b, liquid pressure is admitted beneath the piston in the piston and cylinder assembly 61 or 61a, while liquid is exhausted from the space above the piston causing the linkage 57, 63 to fold while swinging the arms 52 or 52a clockwise and moving the rod 5 to the right.

In order to enable the mandrel M to be dismantled, the rod 5 is moved further to the right than is the case in the ordinary operation of the device. For this purpose the replaceable bearing members 51 (Figure 1a) are removed from the position shown and located between the opposite faces of the blocks 49 and the left-hand prongs of the fork 50. Therefore the entire assembly comprising the rods and the segments 8 is moved to the right, relatively to the forks 50, to the position shown in Figures 3a, 3b in which the lips 18 are clear of the wings 14a and the wings 23a are clear of the slots 25, whereby the segments 8 are freed from the shaft 1 . . . 1j and can be removed radially.

The strip is wound on the mandrel M in the vicinity of the bearing blocks 11 so as to avoid bending of the segments 8 at their forward ends. Therefore, the longitudinal edges of the segments 8, in the vicinity of the bearing blocks 11, are formed with series of projections 72, the projections 72 on the edges of each segment 8 being interdigitated with the projections 72 on the adjacent edges of the adjacent segments 8. The length of the projections 72 is, of course, such that they remain interdigitated throughout the range of expansion and contraction of the mandrel. The outer surfaces of the projections 72 are, of course, shaped to conform to the arcuate surfaces of the segments and give adequate support to the wound strip between the main bodies of the segments 8.

The mandrel M is designed for coiling strip delivered from a hot rolling mill and is, therefore, water cooled. For this purpose the cylindrical portion 1b of the shaft, just to the rear of the segments, is formed with an annular recess 73 surrounded by a sleeve 74, formed with ports 75. The sleeve 74, in turn, is surrounded by a stationary sleeve 76 formed with an internal groove 77 in register with the ports 75. Water is pumped into the groove 77 through a pipe 78 (Figure 1b) and lateral leakage from the sleeve 76 is prevented by two sealing rings 79 held in position by collars 80 fixed to the sleeve 76.

Figure 4:
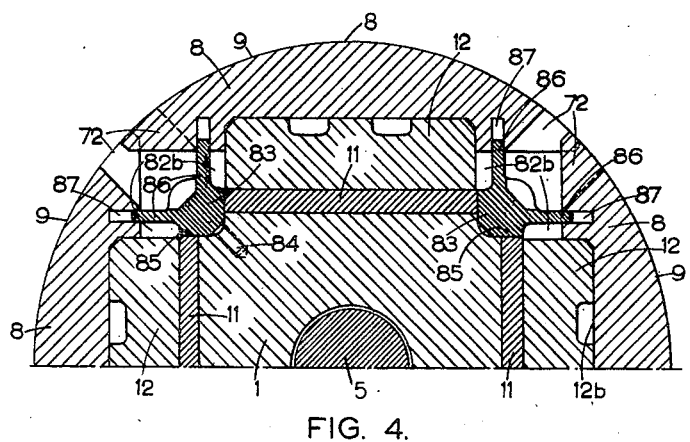
Figure 4 is a section on the line IV—IV in Figure 2b.
Figure 5:
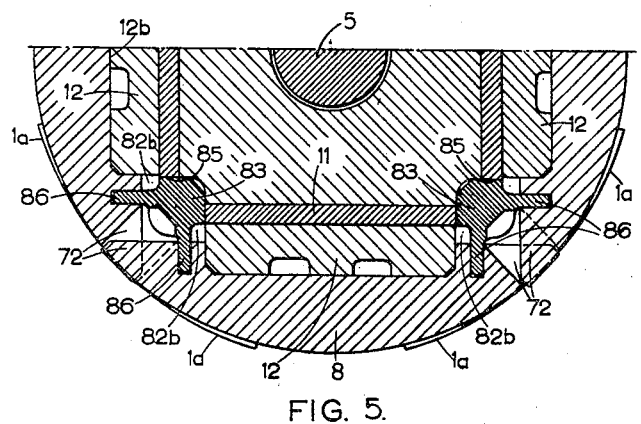
Figure 5 is a section on the line V—V in Figure 3.

The water leaves the annular recess 73 through four passages 81 formed in the part 1a of the mandrel shaft. The passages 81, at their forward ends, register respectively with the ends of short grooves 82 formed in members 83 fixed respectively in corners in the square part 1 of the mandrel shaft by screws 84, the members 83 being formed with V-shaped bearing portions 85 that fit into the corners of the square part 1 of the mandrel shaft between the bearing blocks 11 as shown in Figures 4 and 5. The water escapes from a space 82a (Figure 9) at the rear of the bearing portions 85 into spaces 82b (Figures 4 and 5) between flanges 86, formed on the members 83, and the sides of the wedge members 12. The outer edges of these flanges 86 are a neat sliding fit in slots 87 in the segments 8. It will be seen that the spaces 82b between parallel flanges 86 that is to say, the flanges on opposite sides of any one wedge member 12 are joined by the gaps 82c (Figure 2b) between opposite wedge faces 10 and 13. The bearing portions 85 do not extend as far as the end of the mandrel shaft and the water streams in each pair of spaces 82a unite beneath the associated flanges 86 beyond the associated bearing portion 85, so that the mandrel shaft is then entirely surrounded by water. Beyond the mandrel shaft the water enters the space 82c surrounding the rod 5 and is discharged from this space (Figure 2b) through four passages 28a in the cruciform plate 28. Beyond the plate 28 the water escapes from the mandrel. However, the sealing member 39 ensures that part of the water is deflected towards the centre of the mandrel and escapes between the tube 37 and collar 39a. Water is prevented from escaping backwards along the rod 5 by sealing ring 6a held in position by collar 6b.

Returning to the thrust bearing 3 it will be seen that this comprises two rings of taper rollers 88 (Figure 2a), on inner races 89 surrounding the part 1c of the mandrel shaft and clamped in position between collars 90 by nuts 91 screwed onto the part 1d of the mandrel shaft, the reaction being taken by the end of the part 1b of the mandrel. The rollers run on an outer race 92, clamped against a face 93 on a stationary sleeve 94 by a collar 95. The thrust bearing 4 likewise comprises two rings of taper rollers 96, running on inner races 97 clamped between collars 98 by nuts 99 screwed onto the part 1h of the mandrel shaft, the reaction being taken by the end of the part 1e of the mandrel shaft. The stationary race 100 is mounted similarly to the race 92 of the bearing 3, in a sleeve 101.

It is to be understood that the metal bearing blocks and bushes referred to above may be replaced by non-metallic units; for example, a synthetic resin with a fabric filler. It is also to be understood that the water used for cooling also serves to lubricate the various sliding surfaces. The cooling effect of the water makes possible the use of non-metallic bearings that are bad conductors of heat.

What we claim is:

1. A collapsible mandrel assembly comprising, in combination, fixed supporting means, a shaft mounted for rotation on said supporting means, a number of segments distributed around said shaft and presenting a mandrel surface on which strip material can be coiled, means for transmitting torque from said shaft to said segments, means for retaining said segments on said shaft while permitting radial adjustment of said segments, means, including members formed with wedge faces engaging like wedge faces on the segments, for adjusting said segments radially, means for locking said segments in an extreme position of radial adjustment corresponding to the expanded condition of the mandrel, an abutment fixed against translational movement relatively to said supporting means, at least so long as said means for adjusting said segments are locked as aforesaid, resilient means mounted to act between said segments and said abutment so as to enable said segments to yield in the event of abnormally large hoop stress in material coiled on the mandrel being encountered, and means, including said members formed with wedge faces, defining ducts extending axially along the mandrel close to the mandrel surface for conveying copious quantities of water for cooling the mandrel in the expanded condition.

2. A collapsible mandrel according to claim 1, in which said means for adjusting said segments radially includes means for moving said segments to-and-fro in the axial direction with respect to said shaft and mechanism interposed between said shaft and said segments for automatically adjusting the radial distance of said segments from the shaft axis as a function of the axial position of said segments relatively to said shaft.

3. A collapsible mandrel comprising in combination, a tubular shaft mounted for rotation and provided with wedge faces distributed therealong and thereabout, a plurality of segments, each formed with rows of wedge faces mating with rows of wedge faces on said shaft, said segments presenting a mandrel surface on which strip material can be coiled, a member mounted to reciprocate in said tubular shaft, means connecting said segments to said member to transmit axial movement to said segments while permitting them to move radially inwards and outwards as they ride on said first-mentioned wedge faces, means for retaining said segments on said shaft while permitting said axial and radial movement of said segments, means for transmitting torque from said shaft to said segments, and means including said segments defining ducts extending axially along the mandrel, close to the mandrel surface, for conveying copious quantities of fluid for cooling the mandrel, said ducts being open when the mandrel is in expanded condition.

4. A collapsible mandrel according to claim 3, in which said means for transmitting torque between said shaft and said segments comprises interengaging parts formed respectively on said shaft and said segments, said parts being provided with interengaging wings and recesses, inclined similarly to said wedge faces and overlapping so that their interengaging surfaces force said segments radially inward toward said shaft when said segments are moved longitudinally in the appropriate direction.

5. A collapsible mandrel comprising, in combination, supporting means, a shaft mounted for rotation on said supporting means, a plurality of segments distributed round said shaft and presenting a mandrel surface on which strip material can be coiled, means for transmitting torque between said shaft and said segments, means for retaining said segments on said shaft while permitting axial movement of said segments and radial adjustment thereof, means for moving said segments to-and-fro in the axial direction with respect to said shaft, mechanism interposed between said shaft and said segments for automatically adjusting the radial distance of said segments from said shaft axis as a function of the axial position of said segments relatively to said shaft, said means for moving said segments to-and-fro including a toggle-linkage arranged to take up a dead centre position to hold said segments in their radially outermost positions, means for holding said toggle linkage in its dead centre position, an abutment fixed against translational movement relatively to said supporting means, at least so long as said toggle linkage is in its dead-centre position, resilient means mounted to act between said segments and said abutment so as to enable said segments to yield in the event of abnormally large hoop stress in material coiled on the mandrel being encountered, and means including said segments defining ducts extending axially along the mandrel, close to the mandrel surface, for conveying copious quantities of fluid for cooling the mandrel, said ducts being open when the mandrel is in expanded condition.

6. A collapsible mandrel according to claim 5, in which said shaft is hollow and in which said means for moving said segments to-and-fro include an actuating member reciprocable within said shaft and operatively connected with said toggle-linkage, said resilient means being interposed between said member and said segments.

7. A collapsible mandrel comprising, in combination, a hollow shaft mounted for rotation, a plurality of segments distributed round said shaft and presenting a mandrel surface on which strip material can be coiled, means for transmitting torque between said shaft and said segments, means for retaining said segments on said shaft while permitting axial movement of said segments and radial adjustment thereof, an actuating member mounted to reciprocate in said shaft and having an end projecting outside said shaft, said projecting end being provided with two axially spaced abutments, a connecting member surrounding said shaft between said abutments, a helical compression spring surrounding said projecting end and holding said connecting member against the inner one of said abutments while reacting against the outer one of said abutments, said segments being engaged by said connecting member so as to move axially to-and-fro with said reciprocable member but free to move radially towards and away from said shaft, mechanism interposed between said shaft and said segments for automatically adjusting the radial distance of said segments from the shaft axis as a function of the axial position of said segments relatively to said shaft, a fixed abutment member, a toggle-linkage interposed between said abutment member and said reciprocable member, and means for causing said toggle-linkage to fold and open to a dead-centre condition to cause the segments to move radially inwards and outwards.

8. A collapsible mandrel comprising in combination, a tubular shaft mounted for rotation and provided with wedge faces distributed therealong and thereabout, a plurality of segments, each formed with rows of wedge faces mating with rows of wedge faces on said shaft, said segments presenting a mandrel surface on which strip material can be coiled, a member mounted to reciprocate in said tubular shaft, means connecting said segments to said member to transmit axial movement to said segments while permitting them to move radially inwards and outwards as they ride on said first-mentioned wedge faces, means for retaining said segments on said shaft while permitting said axial and radial movement of said segments, means for transmitting torque from said shaft to said segments, means, including said segments, defining ducts extending along the interior of said mandrel, said ducts being open when said segments are in their outermost positions, and means for delivering fluid through said ducts for cooling said segments when in such outermost positions and lubricating said mating wedge faces.

9. A collapsible mandrel comprising in combination, a tubular shaft mounted for rotation and provided with wedge faces distributed therealong and thereabout, a plurality of segments, distributed around said shaft and each formed along the outer face with an arcuate surface and along the inner face with a row of wedge faces mating with a row of wedge faces on said shaft, said segments presenting a mandrel surface on which strip material can be coiled, a member mounted to reciprocate in said tubular shaft, means connecting said segments to said member to transmit axial movement to said segments while permitting them to move radially inwards and outwards as they ride on said first-mentioned wedge faces, means for retaining said segments on said shaft while permitting said axial and radial movement of said segments, means for transmitting torque between said shaft and said segments, spaces for liquid extending along the mandrel between mating pairs of rows of said wedge faces, a stationary manifold surrounding the mandrel at one end thereof and formed with passages for liquid, the mandrel being formed with passages adapted to receive liquid from said manifold during the rotation of the mandrel and deliver the liquid to said spaces, sealing means interposed between adjacent edges of said segments to provide, in all conditions in the range of expansion and contraction of the mandrel, a sealed conduit within and extending along the mandrel to enclose said spaces, and means defining passages for the escape of liquid from said conduit.

10. A collapsible mandrel comprising, in combination, a shaft mounted for rotation, a plurality of segments distributed round said shaft and presenting a mandrel surface on which strip material can be coiled, means for transmitting torque from said shaft to said segments, means for retaining said segments on said shaft while permitting radial adjustment of said segments, means for adjusting the radial distance from the shaft axis of said segments, sealing means interposed between adjacent edges of said segments to provide, in all conditions in the range of expansion and contraction of the mandrel so as to provide a sealed conduit within and extending along the mandrel, and means defining passages for the entry of liquid into and the discharge of liquid from said conduit, said segments being formed with slots extending longitudinally thereof slightly inwards of the arcuate surfaces on said segments, and said sealing means comprising longitudinal flanges extending into said slots.

11. A collapsible mandrel comprising, in combination, a shaft mounted for rotation, a plurality of segments distributed round said shaft and presenting a mandrel surface on which strip material can be coiled, means for transmitting torque from said shaft to said segments, means for retaining said segments on said shaft while permitting radial adjustment of said segments, means for adjusting the radial distance from the shaft axis of said segments, sealing means interposed between adjacent edges of said segments to provide, in all conditions in the range of expansion and contraction of the mandrel so as to provide a sealed conduit within and extending along the mandrel, and means defining passages for the entry of liquid into and the discharge of liquid from said conduit, each of said segments being formed along its outer face with an arcuate surface, said sealing means comprising members fixed to and expanding along said mandrel shaft respectively between the segments in each pair of adjacent segments, each said segment being formed close to its longitudinal edges with slots disposed slightly inwards of the arcuate surface of said segment and each said member being formed with two flanges projecting into slots in the two adjacent segments.

12. A collapsible mandrel comprising, in combination, a shaft mounted for rotation, a plurality of segments distributed round said shaft and presenting a mandrel surface on which strip material can be coiled, means for transmitting torque from said shaft to said segments, means for retaining said segments on said shaft while permitting radial adjustment of said segments, means for adjusting the radial distance from the shaft axis of said segments, sealing means interposed between adjacent edges of said segments to provide, in all conditions in the range of expansion and contraction of the mandrel so as to provide a sealed conduit within and extending along the mandrel, and means defining passages for the entry of liquid into and the discharge of liquid from said conduit, each of said segments being formed along its outer face with an arcuate surface, said shaft having a length of square cross-section and there being four segments arranged respectively face-to-face with the faces of said length of square cross-section, said segments being formed with parallel slots on their inner faces, close to their edges, and said sealing means comprising four members fixed respectively to the corners of said shaft length and each formed with two flanges at right angles having a near sliding fit respectively in slots in adjacent edges of two segments.

References Cited in the file of this patent

UNITED STATES PATENTS

| | | |
|---|---|---|
| 824,292 | Gerhard | June 26, 1906 |
| 2,202,563 | Mikaelson | May 28, 1940 |
| 2,352,580 | Wettengel | June 27, 1944 |
| 2,578,953 | Tyrrell | Dec. 18, 1951 |
| 2,586,527 | Ferm | Feb. 19, 1952 |
| 2,591,730 | Sendzmir | Apr. 8, 1952 |
| 2,762,576 | Herr | Sept. 11, 1956 |